United States Patent

Koyama et al.

[11] Patent Number: 5,856,433
[45] Date of Patent: Jan. 5, 1999

[54] APPARATUS FOR MANUFACTURING POLYARYLENE SULFIDE AND PROCESS FOR MANUFACTURING POLYARLENE SULFIDE USING THE APPARATUS

[75] Inventors: Yoshinari Koyama; Kiyoshi Sase, both of Ichihara, Japan

[73] Assignee: Idemitsu Petrochemical Co., Ltd., Tokyo, Japan

[21] Appl. No.: 835,801

[22] Filed: Apr. 16, 1997

[30] Foreign Application Priority Data

Apr. 16, 1996 [JP] Japan ................................. 8-094523

[51] Int. Cl.⁶ ........................... B01J 19/02; C22C 19/05; C08G 75/16
[52] U.S. Cl. .......................................... 528/388; 422/241
[58] Field of Search .................... 528/381, 388, 528/387; 422/241

[56] References Cited

U.S. PATENT DOCUMENTS

| | | | |
|---|---|---|---|
| 4,383,092 | 5/1983 | Ko et al. | 526/62 |
| 4,794,161 | 12/1988 | Kato et al. | 528/388 |
| 4,794,163 | 12/1988 | Inoue et al. | 528/388 |
| 4,841,019 | 6/1989 | Iwasaki et al. | 528/388 |
| 4,886,871 | 12/1989 | Satake et al. | 528/226 |
| 4,910,294 | 3/1990 | Ogata et al. | 528/388 |
| 5,126,430 | 6/1992 | Senga et al. | 528/388 |
| 5,342,920 | 8/1994 | Imai et al. | 528/388 |
| 5,391,598 | 2/1995 | Zeitler | 524/87 |
| 5,475,081 | 12/1995 | Imai et al. | 528/388 |
| 5,556,594 | 9/1996 | Frank et al. | 420/448 |
| 5,635,587 | 6/1997 | Koyama et al. | 528/381 |
| 5,672,215 | 9/1997 | Azuma et al. | 148/325 |

FOREIGN PATENT DOCUMENTS

547718A2  6/1993  European Pat. Off. .

*Primary Examiner*—Robert H. Harrison
*Attorney, Agent, or Firm*—Oblon, Spivak, McClelland, Maier & Neustadt, P.C.

[57] ABSTRACT

An apparatus for manufacturing polyarylene sulfide is disclosed. At least the major part of the apparatus which comes into contact with liquid materials is made of the alloy containing nickel and chromium as essential components, or the two phase stainless steel, possessing the following characteristics (A) and/or (B):

The characteristic (A): the characteristic of exhibiting a degree of surface corrosion of 3 μm/y or less when immersed in a 3.6 mol/kg solution of lithium hydrosulfide in a non-proton organic solvent at 130° C. for 90 days, while this solution is replaced with a fresh solution once every 30 days.

The characteristic (B): the characteristic of exhibiting a degree of surface corrosion of 10 μm/y or less when immersed in a 3.6 mol/kg solution of lithium chloride in a non-proton organic solvent at 260° C. for 90 days, while this solution is replaced with a fresh solution once every 30 days.

4 Claims, No Drawings

APPARATUS FOR MANUFACTURING POLYARYLENE SULFIDE AND PROCESS FOR MANUFACTURING POLYARLENE SULFIDE USING THE APPARATUS

BACKGROUND OF THE INVENTION

1. Field of the Invention

The present invention relates to an apparatus for manufacturing polyarylene sulfide and a process for manufacturing polyarylene sulfide using the apparatus. More particularly, the present invention relates to a corrosion resistant apparatus for manufacturing polyarylene sulfide which is used suitably in electricity-electronic fields, the vehicle field such as automobiles, and the heat resistance material field, and to an efficient and inexpensive process for manufacturing polyarylene sulfide using the apparatus.

2. Description of the Background Art

In the manufacture of polyarylene sulfide by the reaction of, for example, an alkali metal sulfide and a dihalogenated aromatic compound in a non-proton organic solvent, a material which is expensive and difficult to work, such as titanium, has been used for the reaction equipment. Because of this, increased plant construction cost and increased fixed costs have been unavoidable.

To expand the demand of the polyarylene sulfide as an engineering plastic, a reduction in its manufacturing costs has been strongly desired.

Specifically, high corrosion resistant characteristics are demanded of various apparatuses for manufacturing polyarylene sulfide, such as dehydration vessels, polymerization vessels, purification tanks, distillation towers, transportation pipes, storage tanks, separation tanks, and solvent removal tanks, because these apparatuses are exposed to strong alkali components, sulfides, chlorides, organic solvents, and the like at a high temperature of 200° C. or higher during the polymerization of polyarylene sulfide. Even stainless steel which is said to be strongly resistant to corrosion produces metal sulfides, such as iron sulfide or nickel sulfide, by a reaction with a sulfide which is present in the polymerization process. Almost all these metal sulfides are ultimately included in the produced polyarylene sulfide. For this reason, titanium materials which excel in corrosion resistance have conventionally been used.

For example, Japanese Patent Publication No. 39537/1991 describes the use of a titanium material for a liquid-contact section of the dehydration step.

An apparatus for the manufacture of polyarylene sulfide made of iron-chromium ferrite type stainless steel having a specific composition is described in Japanese Patent Publication No. 213338/1989.

Japanese Patent Publication No. 49761/1994 describes a method for suppressing corrosion in the reaction vessel by reacting a mixture of an alkali metal sulfide, water, and a non-proton organic polar solvent at a ratio of 1:10–20:1–10 with heating to obtain a dehydration reaction mixture and reacting this reaction mixture reaction with a dihalogenated aromatic compound.

The titanium material disclosed in Japanese Patent Publication No. 39537/1991, however, is more expensive and its workability is poorer than stainless steel and the like, requiring stringent control during manufacture of the apparatus, resulting in increased manufacturing costs.

Although the apparatus described in Japanese Patent Publication No. 213338/1989 appears to be fairly close to a commercial level with regard to corrosion resistance, this apparatus is not necessarily satisfactory. In addition, it is difficult to judge the applicability in practical use of the apparatus from the data disclosed, because the corrosion data used for calculating the yearly corrosion quantity is based on an immersion test carried out for only a very short period of time in comparison with an industrial production period.

Moreover, because the polyarylene sulfide produced by the method disclosed in Japanese Patent Publication No. 49761/1994 contains several ppm of iron, this polyarylene sulfide is unsuitable for use in applications to electronic components and films requiring a high level of surface smoothness.

In addition, stainless steel is known to produce cracks due to stress corrosion when used for a long time under conditions such as those required for the polymerization of polyarylene sulfide.

The present invention has been completed with an object of solving these problems and providing an apparatus for the manufacture of polyarylene sulfide with excellent corrosion resistance and an efficient and inexpensive process for manufacturing the polyarylene sulfide using this apparatus.

In order to achieve the above-mentioned object, the inventors of the present invention have conducted extensive studies on various materials which make up the apparatuses. As a result, the inventors have found that an apparatus for the manufacture of polyarylene sulfide which exhibits almost the same corrosion resistance as the titanium material can be manufactured from at least one material selected from the group consisting of Incoloy-type alloys, Carpenter-type alloys, Hastelloy-type alloys, and two phase stainless steel. This finding has led to the completion of the present invention.

SUMMARY OF THE INVENTION

Accordingly, an object of the present invention is to provide an apparatus for manufacturing polyarylene sulfide, of which at least the major part which comes into contact with liquid materials is made of an alloy containing nickel and chromium as essential components, or a two phase stainless steel, wherein the alloy containing nickel and chromium as essential components or the two phase stainless steel possesses:

a characteristic (A) of exhibiting a degree of surface corrosion of 3 $\mu$m/y or less when immersed in a 3.6 mol/kg solution of lithium hydrosulfide in a non-proton organic solvent at 130° C. for 90 days, while this solution is replaced with a fresh solution once every 30 days, and/or a characteristic (B) of exhibiting a degree of surface corrosion of 10 $\mu$m/y or less when immersed in a 3.6 mol/kg solution of lithium chloride in a non-proton organic solvent at 260° C. for 90 days, while this solution is replaced with a fresh solution once every 30 days.

In a preferred embodiment of the apparatus for manufacturing polyarylene sulfide of the present invention, the alloy containing nickel and chromium as essential components or the two phase stainless steel is at least one material selected from the following groups (1) to (4):

(1) a two phase stainless steel having a structure comprising finely mixed 20–50 wt % of the austenite phase and 50–80 wt % of the ferrite phase, 20–45 wt % of other elements as optional components, and the balance iron;

(2) an alloy comprising 5–45 wt % of nickel and 10–25 wt % of chromium, or 5–45 wt % of nickel, 10–25 wt % chromium, and 8–20 wt % of cobalt, as essential components, and 0.5–15 wt % of other elements as optional components, and the balance an austenite-type stainless steel;

(3) an alloy comprising 26–42 wt % of nickel, 7–35 wt % of chromium, and 0–25 wt % of molybdenum, as essential components, 0–20 wt % of other elements as optional components, and the balance iron; and (4) an alloy comprising 45–80 wt % of molybdenum or 3–40 wt % of molybdenum and 0–25 wt % of chromium, as essential components, 1–20 wt % of other elements as optional components, and the balance nickel.

Another object of the present invention is to provide a process for manufacturing polyarylene sulfide comprising reacting a liquid or gaseous sulfur compound and a dihalogenated aromatic compound in a non-proton organic solvent, wherein the above-described apparatus for manufacturing polyarylene sulfide is used at least for the part coming into contact with the liquid materials.

In a preferred embodiment of the process for manufacturing polyarylene sulfide, lithium hydroxide and/or lithium N-methylaminobutyrate (LMBA) are further added in addition to the liquid or gaseous sulfur compound and the dihalogenated aromatic compound.

An apparatus for the manufacture of polyarylene sulfide exhibiting almost the same corrosion resistance as the apparatus made of titanium can be provided by the present invention.

In addition, an efficient and inexpensive process for manufacturing polyarylene sulfide can be provided by using this apparatus.

Other objects, features and advantages of the invention will hereinafter become more readily apparent from the following description.

DETAILED DESCRIPTION OF THE INVENTION AND PREFERRED EMBODIMENTS

Preferred embodiments of the present invention will now be explained in detail.

I. APPARATUS FOR MANUFACTURING POLYARYLENE SULFIDE

The apparatus for manufacturing polyarylene sulfide of the present invention is characterized in that at least the major part of the apparatus which comes into contact with the liquid materials is made of an alloy containing nickel and chromium as essential components or a two phase stainless steel having specific characteristics.

The apparatus for manufacturing polyarylene sulfide in the present invention includes dehydration vessels, polymerization vessels, washing tanks, separation tanks, solvent removal tanks, pipes joining these vessels and tanks, and parts which come into contact with liquid materials such as solvents and reaction solutions.

The apparatus may serve a double purpose, for example, as a dehydration vessel and a polymerization vessel. In the present invention, the whole apparatus for manufacturing polyarylene sulfide need not be made of such a specific material, but it is sufficient that the major part coming into contact with liquid materials, such as solvents and liquid reaction mixtures, be made of such a material.

1. Characteristics (A) and (B) required for the alloy containing nickel and chromium as essential components or the two phase stainless steel (1) Characteristic (A)

The characteristic (A) is the characteristic of exhibiting a degree of surface corrosion of 3 $\mu$m/y or less, preferably 1 $\mu$m/y or less, when immersed in a 3.6 mol/kg solution of lithium hydrosulfide in a non-proton organic solvent at 130° C. for 90 days, while this solution is replaced with a fresh solution once every 30 days.

The degree of surface corrosion indicates the depth of corroded material in one year ($\mu$m/year) as calculated from the depth of corrosion during the test ((X $\mu$m)×365/90).

A material exhibiting a degree of surface corrosion of greater than 3 $\mu$m/y in this test lacks reliability as a material for the apparatus for industrially manufacturing polyarylene sulfide by continuous operation extending over a long period of time.

(2) Characteristic (B)

The characteristic (B) is the characteristics of exhibiting a degree of surface corrosion of 10 $\mu$m/y or less, preferably of 5 $\mu$m/y or less, when immersed in a 3.6 mol/kg solution of lithium chloride in a non-proton organic solvent at 260° C. for 90 days, while this solution is replaced with a fresh solution once every 30 days.

A material exhibiting a degree of surface corrosion of greater than 10 $\mu$m/y in this test lacks reliability as a material for the apparatus for industrially manufacturing polyarylene sulfide by continuous operation extending over a long period of time.

Although it is desirable that the material used in the present invention have both of these characteristics (A) and (B), a material with either one of these characteristics is also acceptable.

2. Specific examples

Specific examples of the materials possessing these characteristics (A) and/or (B) will now be described.

(1) Stainless steel with a structure comprising finely mixed austenite phase and ferrite phase material A preferred example which can be given is a two phase stainless steel having a structure comprising finely mixed 20–50 wt % of the austenite phase and 50–80 wt % of the ferrite phase, and containing 18–30 wt % of chromium, 1–15 wt % of nickel, and, as optional components, at least one element selected from the group consisting of silicon, titanium, manganese, molybdenum, and copper. A particularly preferred material is SUS329J4L according to the JIS or a material having a composition equivalent this material but with a different specification.

(2) An alloy comprising 5–45 wt % of nickel and 10–25 wt % of chromium, or 5–45 wt % of nickel, 10–25 wt % of chromium, and 8–20 wt % of cobalt, as essential components, and 0.5–15 wt % of at least one element selected from the group consisting of manganese, silicon, molybdenum, tungsten, niobium, titanium, aluminum, boron, vanadium, zirconium as optional components A preferred example of this type of alloy is an alloy comprising 30–45 wt % of nickel, 15–25 wt % of chromium, 1–4 wt % of titanium, and 0.07–1.5 wt % of aluminum as essential components, and the balance austenite-type stainless steel.

Specific examples include Incoloy™ 825 manufactured by Mitsubishi Material Co., Ltd. and other alloys with the equivalent composition but available under a different trademark.

(3) An alloy comprising 26–42 wt % of nickel, 7–35 wt % of chromium, and 2–10 wt % of molybdenum, as essential components, 0–20 wt % of at least one element selected from the group consisting of manganese, silicon, molybdenum, tungsten, niobium, titanium, aluminum, boron, vanadium, selenium, cobalt, and copper as optional components, and the balance iron A preferred example is an alloy comprising 30–40 wt % of nickel, 15–25 wt % of chromium, and 2–5 wt % of molybdenum, and 0–20 wt % of at least one element selected from the group consisting of manganese, silicon, molybdenum, tungsten, niobium, titanium, aluminum, boron, vanadium, selenium, cobalt, and copper as optional components, and the balance iron.

Specific examples include Carpenter™ 20CB3 manufactured by Mitsubishi Material Co., Ltd. and other alloys with the equivalent composition but available under a different trademark.

(4) An alloy comprising 45–80 wt % of molybdenum or 3–40 wt % of molybdenum and 0.1–25 wt % of chromium, as essential components, 1–20 wt % of at least one element selected from the group consisting of chromium, tungsten, iron, silicon, manganese, and vanadium as optional components, and the balance nickel A preferred example is an alloy comprising 10–20 wt % of molybdenum and 10–25 wt % of chromium, as essential components, 0–20 wt % of at least one element selected from the group consisting of chromium, tungsten, iron, silicon, manganese, and vanadium as optional components, and balance nickel.

Specific examples include Hastelloy™ C-22 manufactured by Mitsubishi Material Co., Ltd. and other alloys with the equivalent composition, but available under a different trademark.

Among these materials, particularly preferred in view of excellent corrosion resistance, superb strength, high processability, and availability at a low cost is two phase stainless steel, particularly, materials according to JIS SUS329-J4L.

Specifically, the process comprises manufacturing polyarylene sulfide using an apparatus wherein at least a part thereof which comes in contact with the solvents or reaction solutions is made of the above-described material.

There are no specific restrictions to the process for manufacturing polyarylene sulfide, except for using the specific apparatuses. The process described, for example, in Japanese Patent Application Laid-open No. 213653/1995 can be used.

Specifically, this process comprises carrying out a preliminary polymerization reaction using polymerization components which comprises lithium hydroxide and/or lithium N-methylaminobutyrate, a liquid or gaseous sulfur compound, and a dihalogenated aromatic compound in a non-proton organic solvent, adding water to the resulting polymerization solution to separate a polymer concentrate layer from a solvent layer, adding a solvent to the polymer concentrate layer, and subjecting the mixture to a main polymerization reaction.

Other features of the invention will become apparent in the course of the following description of the exemplary embodiments which are given for illustration of the invention and are not intended to be limiting thereof.

EXAMPLES

The composition of the materials for the apparatuses used in the following examples and comparative examples are shown in Table 1.

TABLE 1

|    | Incoloy 825 | Carpenter 20CB3 | Hastelloy C-22 | SUS329J4L | Chromium-ferrite SUS | Inconnel 600 | SUS304 | SUS316L |
|----|-------------|-----------------|----------------|-----------|----------------------|--------------|--------|---------|
| Ni | 39.5        | 34.4            | Balance        | 6.85      | 0.210                | Balance      | 10.0   | 13.0    |
| Cr | 22.0        | 19.9            | 21.4           | 25.0      | 30.1                 | 15.4         | 20.0   | 17.0    |
| Mo | 3.30        | 2.80            | 13.3           | 3.22      | 1.83                 | —            | —      | 2.50    |
| Mn | 0.300       | 0.800           | 0.080          | 0.570     | 0.090                | 0.200        | 1.00   | 1.50    |
| C  | 0.020       | 0.030           | 0.003          | 0.013     | 0.010                | 0.030        | 0.010  | 0.010   |
| Cu | 2.20        | 3.40            | —              | —         | —                    | 0.100        | —      | —       |
| Si | 0.200       | 0.520           | 0.010          | 0.280     | —                    | 0.100        | 0.020  | 0.050   |
| S  | <0.010      | <0.001          | <0.010         | 0.010     | —                    | <0.001       | 0.010  | 0.010   |
| P  | —           | 0.007           | 0.010          | 0.026     | —                    | —            | 0.020  | 0.020   |
| Al | 0.100       | —               | —              | —         | —                    | —            | —      | —       |
| Ti | 1.20        | —               | —              | —         | —                    | —            | —      | —       |
| Nb | —           | 0.780*          | —              | —         | 0.13                 | —            | —      | —       |
| N  | —           | —               | —              | 0.280     | 0.010                | —            | —      | —       |
| Fe | Balance     | Balance         | 5.40           | Balance   | Balance              | 10.4         | Balance| Balance |

*Nb + Ta

Although stainless steel and stainless alloys have conventionally been considered to be inappropriate for the apparatus used in the manufacture of polyarylene sulfide due to insufficient corrosion resistance, the stainless steel and stainless alloys with the characteristics defined in the present invention have been confirmed by the evaluation described hereinafter to have sufficient corrosion resistance and to be usable without problem in industrial production.

II. PROCESS FOR MANUFACTURING POLYARYLENE SULFIDE

The process of the present invention is characterized in that the above-described apparatus for manufacturing polyarylene sulfide is used at least for the part which comes in contact with the liquid materials.

EXAMPLE 1
<Synthesis of Lithium Sulfide>

3326.4 g (33.6 mol) of N-methyl-2-pyrolidone and 287.4 g (12 mol) of lithium hydroxide were charged into a 10 liter autoclave made of a two phase stainless steel (SUS329J4L, manufactured by Sumitomo Metal Industries, Ltd.) equipped with stirring blades. The mixture was heated to 130° C. while stirring at a rate of 300 rpm. After the temperature rise, hydrogen sulfide was fed into the mixture at a rate of 3 l/min for two hours to produce lithium hydrogen sulfide.

The resulting reaction mixture was heated in a nitrogen stream (200 ml/min) to dehysrosulfide a part of the reacted hydrogen sulfide. As the temperature increased, water produced by the synthesis of lithium sulfide began to evaporate.

This by-product water was condensed by a condenser and sent out of the system. The temperature continued to rise as the water evaporated was removed outside the system. When the temperature of the reaction mixture reached 180° C., further temperature rise was stopped and the mixture was maintained constant at this temperature. The synthesis of lithium sulfide was terminated after two hours while the temperature was maintained constant. Then, the mixture was cooled to cause lithium sulfide to precipitate as a solid.

This slurry liquid was collected while stirring to measure the lithium sulfide concentration according to the following method. Specifically, the sulfur concentration was analyzed by the iodometric method (a dilute hydrochloric acid solution was added to the sample liquid, followed by the addition of a surplus amount of an iodine solution. Then, reverse titration of an excess amount of the iodine solution was carried out using a sodium thiosulfate standard solution) and the lithium concentration was analyzed by ion chromatography. The result of the analysis was S/Li=0.49 mol frac.

<Preliminary Polymerization and Main Polymerization>

Then, 882.0 g (6 mol) of p-dichlorobenzene was added to this autoclave and the temperature was increased to 220° C. The preliminary polymerization was carried out for two hours at this temperature. Following this, the temperature was raised to 260° C., where the main polymerization reaction was carried out for three hours. After the polymerization, the polymer was separated from the reaction mixture using a 60 mesh sieve, followed by washing and drying using water and acetone to obtain polyarylene sulfide. This polyarylene sulfide was dissolved in α-chloronaphthalene to a concentration of 0.4 g/dl to measure the viscosity using Ubbelohde's viscosimeter at 206° C. As a result, the polyarylene sulfide was found to have an inherent viscosity ($\eta_{inh}$) of 0.25.

<Analysis of Metal Components>

The resulting polyarylene sulfide granules were weighed using a platinum pot and incinerated in a muffle furnace at 600° C. for 10 hours. The ash remained in the platinum pot was analyzed by the atom absometric method. The results of the analysis are shown in Table 2.

EXAMPLE 2

The same experiment as in the Example 1 was carried out, except that SUS316L covered with Incoloy 825 (manufactured by Mitsubishi Material Co., Ltd.) with a thickness of 2 mm was used for the inner surface (liquid-contact parts) of the autoclave.

EXAMPLE 3

The same experiment as in the Example 1 was carried out, except that SUS316L covered with Carpenter 20CB3 (manufactured by Mitsubishi Material Co., Ltd.) with a thickness of 2 mm was used for the inner surface (liquid-contact parts) of the autoclave.

EXAMPLE 4

The same experiment as in the Example 1 was carried out, except that SUS316L covered with Hastelloy C-22 (manufactured by Mitsubishi Material Co., Ltd.) with a thickness of 2 mm was used for the inner surface (liquid-contact parts) of the autoclave.

COMPARATIVE EXAMPLE 1

The same experiment as in the Example 1 was carried out, except that SUS316L covered with a chromium ferrite type SUS (shown in Table 1) with a thickness of 2 mm was used for the inner surface (liquid-contact parts) of the autoclave.

COMPARATIVE EXAMPLE 2

The same experiment as in the Example 1 was carried out, except that SUS316L covered with Inconel 600 (shown in Table 1) with a thickness of 2 mm was used for the inner surface (liquid-contact parts) of the autoclave.

COMPARATIVE EXAMPLE 3

The same experiment as in the Example 1 was carried out, except that SUS316L was used as the material of the autoclave.

TABLE 2

| | Metal content in polyarylene sulfide | | | |
|---|---|---|---|---|
| | Material for Autoclave or liquid contact parts | Metal content in samples (ppm) | | |
| | | Cr | Ni | Fe | Ti |
| Example 1 | SUS329J4L | 0.5 | 0.2 | 0.9 | N.D. |
| Example 2 | Incoloy 825 | 1.2 | 0.8 | 1.0 | N.D. |
| Example 3 | Carpenter 20CB3 | 0.9 | 0.9 | 0.6 | N.D. |
| Example 4 | Hastelloy C-22 | 0.4 | 0.8 | — | N.D. |
| Comparative Example 1 | Chromium-ferrite SUS | 17.0 | 0.8 | 54.0 | N.D. |
| Comparative Example 2 | Inconel 600 | 16.0 | 8.8 | 90.0 | N.D. |
| Comparative Example 3 | SUS316L | 20.0 | 11.5 | 106.9 | N.D. |
| Reference Example | Titanium | N.D. | N.D. | N.D. | N.D. |

N.D. Not detected (less than 0.1 ppm)

TEST EXAMPLE 1

<Corrosion Test of Various Materials Against Strong Alkali>

About 20 l of a lithium hydrogen sulfide solution was prepared in the same manner as in the Example 1, except that dehydration and dehydrosulfidation were omitted. The lithium hydrogen sulfide solution was subjected to corrosion tests of various materials using a high temperature high pressure corrosion test vessel (10 liter, manufactured by Toshin Kogyo Co., Ltd.). The test items carried out were the all surface corrosion test (a test piece, 20 mm×30 mm×2 mmt) and the stress corrosion cracking test (conforming to JIS G0576 by the U-shape test piece bending method). These tests were carried out at 130° C. for 90 days, during which the liquid was replaced with fresh liquid once every 30 days. The test results are shown in Table 3.

TABLE 3

| | Test results | |
|---|---|---|
| Tested materials | Degree of corrosion ($\mu$m/y) | Penetrant test after stress corrosion test |
| Inconel 600 | 0.3 | No designation |
| Incoloy 825 | 0.2 | No designation |
| Carpenter 20CB3 | 0.2 | No designation |
| Hastelloy HC22 | 0.1 | No designation |
| SUS329J4L | 0.1 | No designation |
| Titanium (TP28) | 0 | No designation |

TEST EXAMPLE 2

<Corrosion Tests of Various Materials Against the Reaction Solution After Removal of the Polyarylene Sulfide>

The corrosion tests of various materials used in the Examples and Comparative Examples were carried out using about 20 l of the reaction solution (after removal of the polymer) produced by the synthesis of polyarylene sulfide in the Example 1. A high temperature high pressure corrosion test vessel (10 liter, manufactured by Toshin Kogyo Co., Ltd.) was used to carry out the two test items; the all surface corrosion test (a test piece, 20 mm×30 mm×2 mmt) and the stress corrosion cracking test (conforming to JIS G0576 by the U-shape test piece bending method). These tests were carried out at 260° C. for 90 days, during which the liquid was replaced with fresh liquid once every 30 days. The test results are shown in Table 4.

TABLE 4

| Tested materials | Test results | |
|---|---|---|
| | Degree of corrosion ($\mu$m/y) | Penetrant test after stress corrosion test |
| SUS304 | 340.0 | Cracks across particles |
| SUS316L | 70.0 | Cracks across particles |
| Inconnel 600 | 61.3 | No designation |
| Incoloy 825 | 4.0 | No designation |
| Carpenter 20CB3 | 8.5 | No designation |
| Hastelloy HC22 | 1.7 | No designation |
| SUS329J4L | 2.5 | No designation |
| Titanium (TP28) | 0 | No designation |

The following findings have been obtained from the results of the above tests.

SUS329J4L used in the Example 1 exhibited excellent corrosion resistance against strong alkali and the reaction solution (containing non-proton organic solvent and the like) and produced polyarylene sulfide with the metal content as small as in polyarylene sulfide manufactured using apparatus made of titanium. This material can be used as a material for the apparatus for industrial manufacture of polyarylene sulfide.

In addition, this material not only have a high strength, but also is significantly cheaper than titanium.

Incoloy 825, Carpenter 20CB3, and Hastelloy C-22 used in the Examples 2 to 4 also exhibited excellent corrosion resistance against strong alkali and the reaction solution (containing non-proton organic solvent and the like) and produced polyarylene sulfide with the metal content as small as in polyarylene sulfide manufactured using apparatus made of titanium. These materials can be used as a material for the apparatus for industrial manufacture of polyarylene sulfide.

These materials are more expensive than SUS329J4L, but significantly cheaper than titanium. The technique for coating these materials onto tanks or the like made of stainless steel or high-strength stainless steel is also significantly easier than that used for coating titanium.

Inconnel 600 used in the Comparative Example 2 did not exhibit sufficient corrosion resistance against the reaction solution (containing non-proton organic solvent and the like). As a result, the metal content of the resulting polyarylene sulfide was considerably higher than that contained in the product obtained in the Example. The product is not usable for electricity-electronic parts which are the major use of polyarylene sulfide. Thus, this material is inadequate as a material for the apparatus for manufacturing polyarylene sulfide.

The titanium used in the Reference Example exhibited excellent corrosion resistance against strong alkali and the reaction solution (containing non-proton organic solvent and the like). The process using titanium as the apparatus produced polyarylene sulfide with a small metal content. Titanium therefore can be used as a material for the apparatus for industrial manufacture of polyarylene sulfide. However, the technology for coating titanium onto tanks or the like made of stainless steel or high-strength stainless steel for reinforcement is very sophisticated, requiring special processing techniques. Coating titanium onto stainless steel or the like is therefore very expensive.

Obviously, numerous modifications and variations of the present invention are possible in light of the above teachings. It is therefore to be understood that, within the scope of the appended claims, the invention may be practiced otherwise than as specifically described herein.

What is claimed is:

1. An apparatus for manufacturing polyarylene sulfide, of which at least a part which comes into contact with liquid materials is made of an alloy containing nickel and chromium as essential components, or a two phase stainless steel, wherein the alloy containing nickel and chromium as essential components or the two phase stainless steel possesses:

a characteristic (A) of exhibiting a degree of surface corrosion of 3 $\mu$m/y or less when immersed in a 3.6 mol/kg solution of lithium hydrosulfide in a non-protonic organic solvent at 130° C. for 90 days, while this solution is replaced with a fresh solution once every 30 days; and/or a characteristic (B) of exhibiting a degree of surface corrosion of 10 $\mu$m/y or less when immersed in a 3.6 mol/kg solution of lithium chloride in a non-protonic organic solvent at 260° C. for 90 days, while this solution is replaced with a fresh solution once every 30 days.

2. The apparatus for manufacturing polyarylene sulfide according to claim 1, wherein the alloy containing nickel and chromium as essential components or the two phase stainless steel is at least one material selected from the following groups (1) to (4):

(1) a two phase stainless steel having a structure consisting of finely mixed 20–50 wt % of the austenite phase and 50–80 wt % of the ferrite phase, 20–45 wt % of other elements as optional components, and the balance iron;

(2) an alloy consisting of 5–45 wt % of nickel and 10–25 wt % of chromium, or 5–45 wt % of nickel, 10–25 wt % chromium, and 8–20 wt% of cobalt, as essential components, and 0.5–15 wt % of other elements as optional components, and the balance an austenite stainless steel;

(3) an alloy consisting of 26–42 wt % of nickel, 7–35 wt % of chromium, and 0–25 wt % of molybdenum, as essential components, 0–20 wt % of other elements as optional components, and the balance iron; and (4) an alloy consisting of 45–80 wt % of molybdenum or 3–40 wt % of molybdenum and 0–25 wt % of chromium, as essential components, 1–20 wt % of other elements as optional components, and the balance nickel.

3. A process for manufacturing polyarylene sulfide comprising reacting a liquid or gaseous sulfur compound and a dihalogenated aromatic compound in a non-protonic organic solvent, wherein the apparatus for manufacturing polyarylene sulfide defined in claim 1 or claim 2 is used at least for the part coming into contact with the liquid materials.

4. The process for manufacturing polyarylene sulfide according to claim 3, wherein lithium hydroxide and/or lithium N-methylaminobutyrate (LMBA) are further added in addition to the liquid or gaseous sulfur compound and the dihalogenated aromatic compound.

* * * * *

UNITED STATES PATENT AND TRADEMARK OFFICE
CERTIFICATE OF CORRECTION

PATENT NO. : 5,856,433
DATED : January 5, 1999
INVENTOR(S) : Yoshinari KOYAMA et al.

It is certified that error appears in the above-identified patent and that said Letters Patent is hereby corrected as shown below:

On the title page, item [54], and Column 1, line 3, the Title should read:

--[54] APPARATUS FOR MANUFACTURING POLYARYLENE SULFIDE AND PROCESS FOR MANUFACTURING POLYARYLENE SULFIDE USING THE APPARATUS--

Signed and Sealed this

Sixth Day of July, 1999

Attest:

Q. TODD DICKINSON

*Attesting Officer*    *Acting Commissioner of Patents and Trademarks*